United States Patent [19]

Thaler et al.

[11] 4,031,300

[45] * June 21, 1977

[54] HIGH MOLECULAR WEIGHT, HIGH UNSATURATION ISOBUTYLENE-CYCLOPENTADIENE COPOLYMERS

[75] Inventors: Warren A. Thaler, Matawan; Donald J. Buckley, Plainfield, both of N.J.; Joseph P. Kennedy, Akron, Ohio

[73] Assignee: Exxon Research and Engineering Company, Linden, N.J.

[ * ] Notice: The portion of the term of this patent subsequent to Apr. 30, 1991, has been disclaimed.

[22] Filed: Nov. 13, 1975

[21] Appl. No.: 631,444

Related U.S. Application Data

[63] Continuation-in-part of Ser. No. 457,109, April 1, 1974, Pat. No. 3,928,297, which is a continuation-in-part of Ser. No. 151,038, June 8, 1971, Pat. No. 3,808,177.

[52] U.S. Cl. .......................... 526/308; 260/33.6 AQ
[51] Int. Cl.² ...................................... C08F 232/06
[58] Field of Search .................................. 526/308

[56] References Cited

UNITED STATES PATENTS

| | | | |
|---|---|---|---|
| 2,521,359 | 9/1950 | Garbor | 260/85.3 |
| 3,080,337 | 3/1963 | Minckler et al. | 260/45.5 |
| 3,808,177 | 4/1974 | Thaler et al. | 260/80.7 |
| 3,928,297 | 12/1975 | Thaler et al. | 260/85.3 A |

*Primary Examiner*—Stanford M. Levin
*Attorney, Agent, or Firm*—H. E. Naylor; R. E. Nanfeldt

[57] ABSTRACT

Substantially gel-free, high molecular weight, high unsaturation copolymers of isobutylene and cyclopentadiene having a number average molecular weight of at least 90,000 and a mole percent of unsaturation of at least 5% and the process for preparing said polymers which comprises carrying out the polymerization in a homogeneous phase, introducing to the system either an aluminum halide in a soluble form or a hydrocarbylaluminum dihalide and carrying the reaction out at a temperature of less than about −100° C.

2 Claims, 8 Drawing Figures

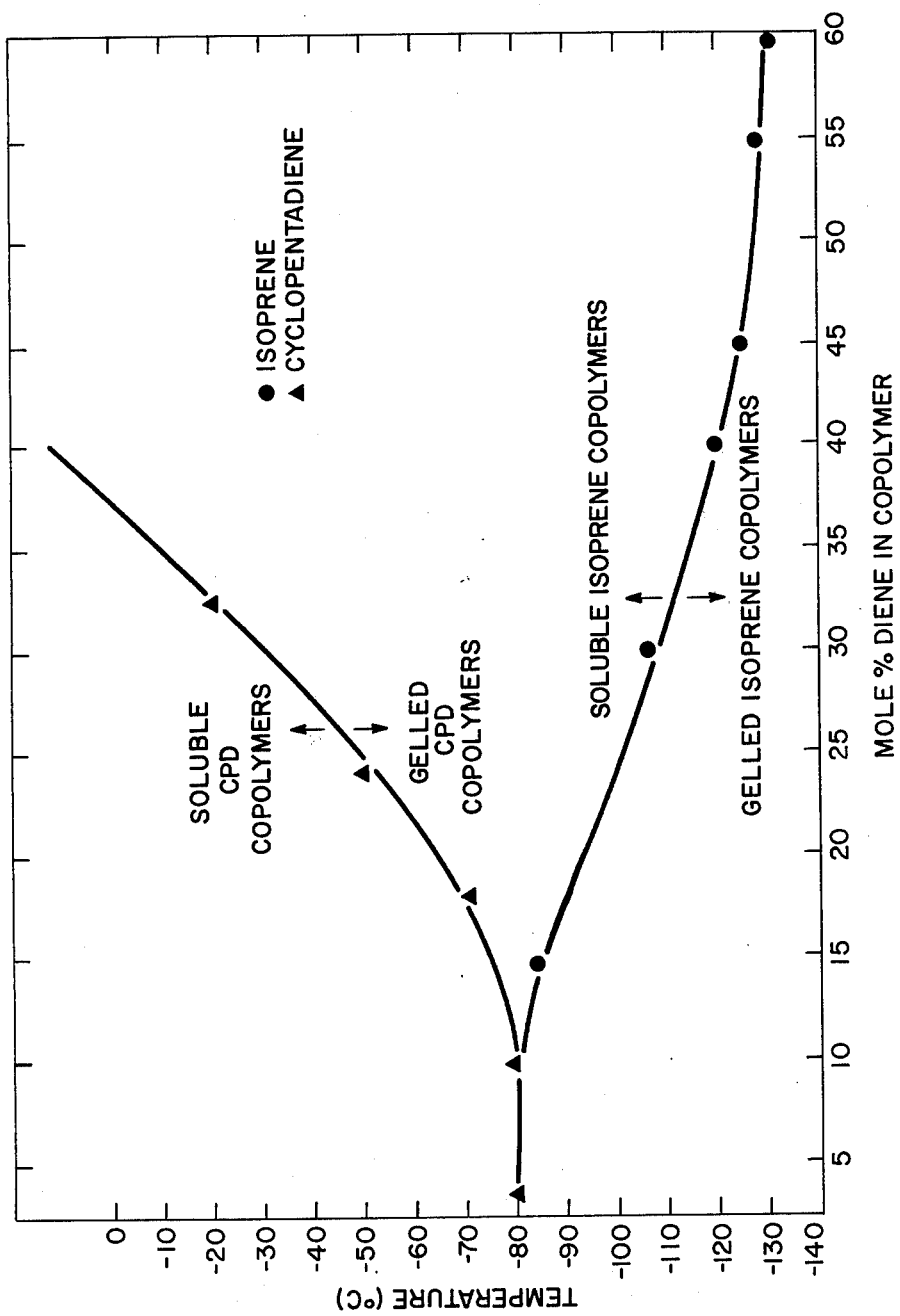

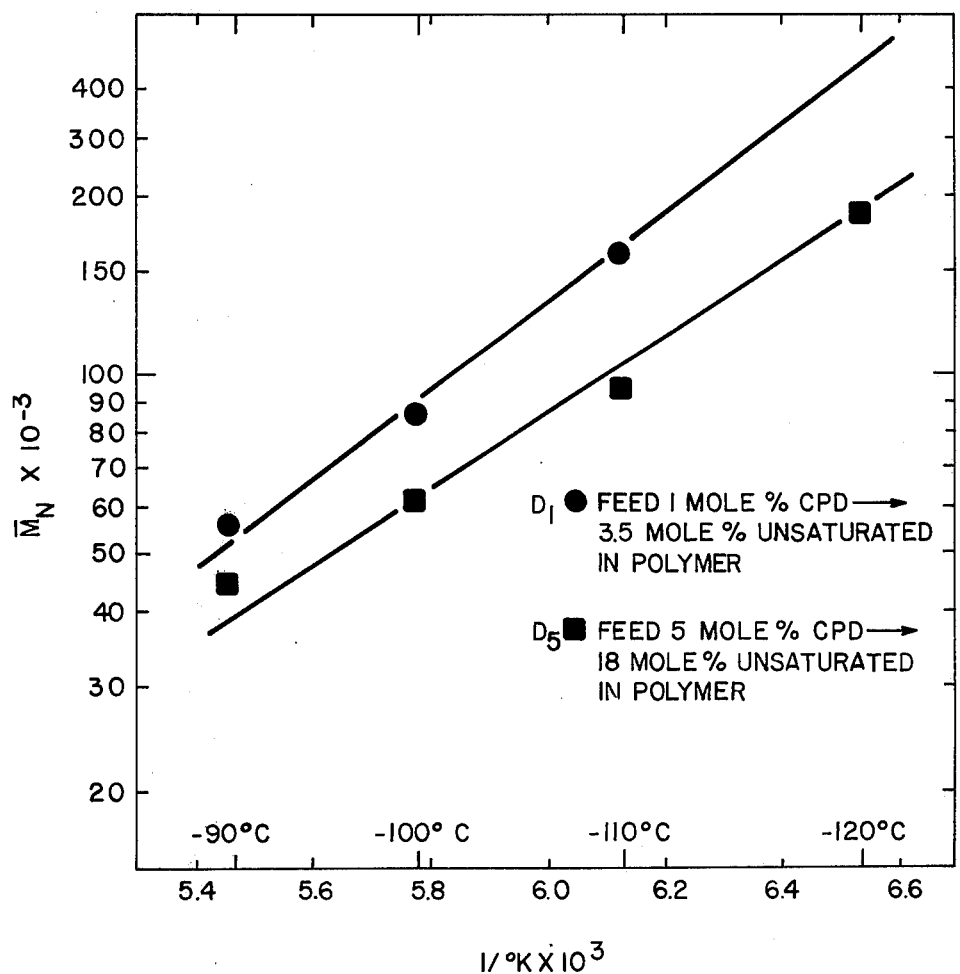

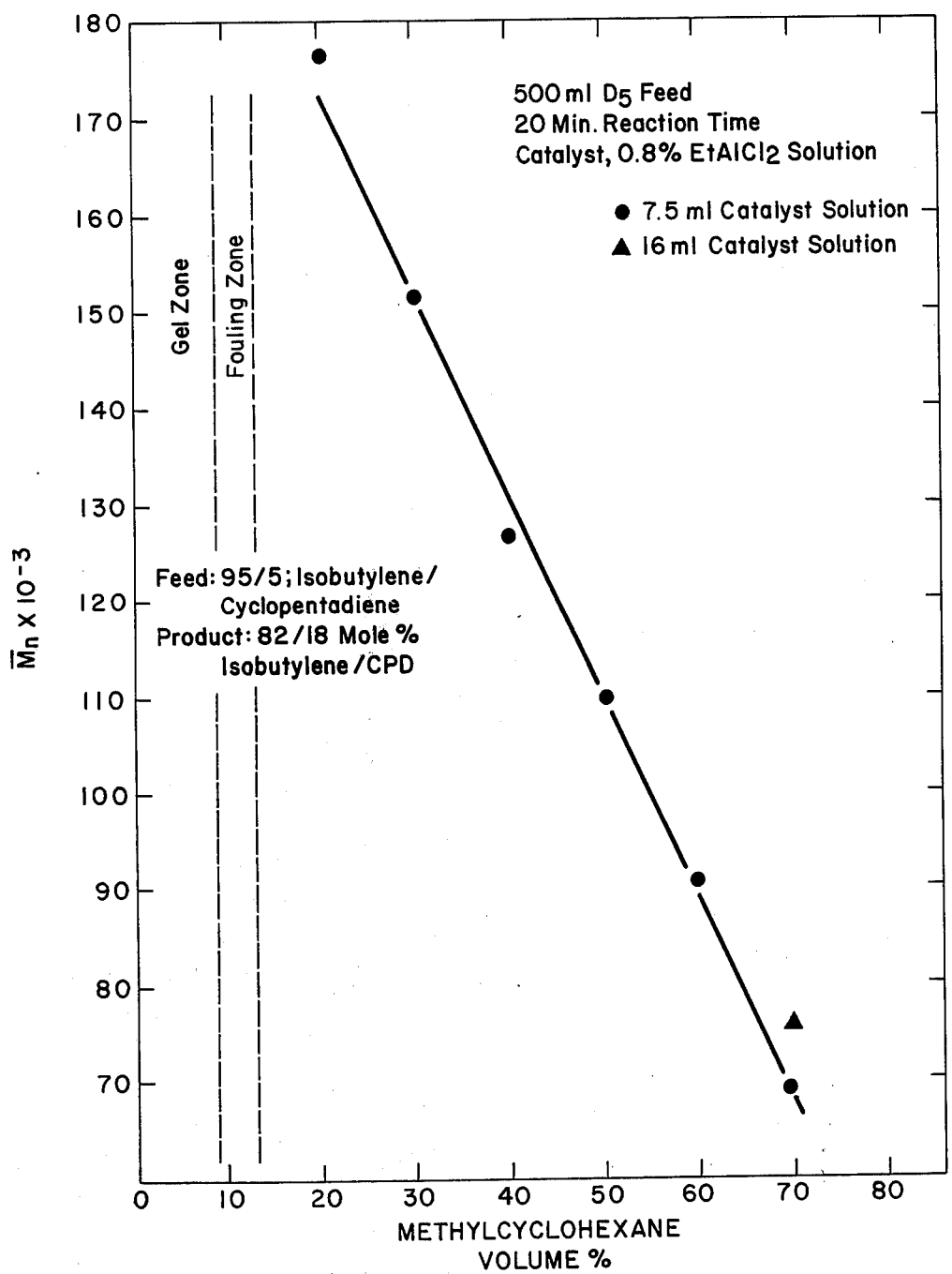

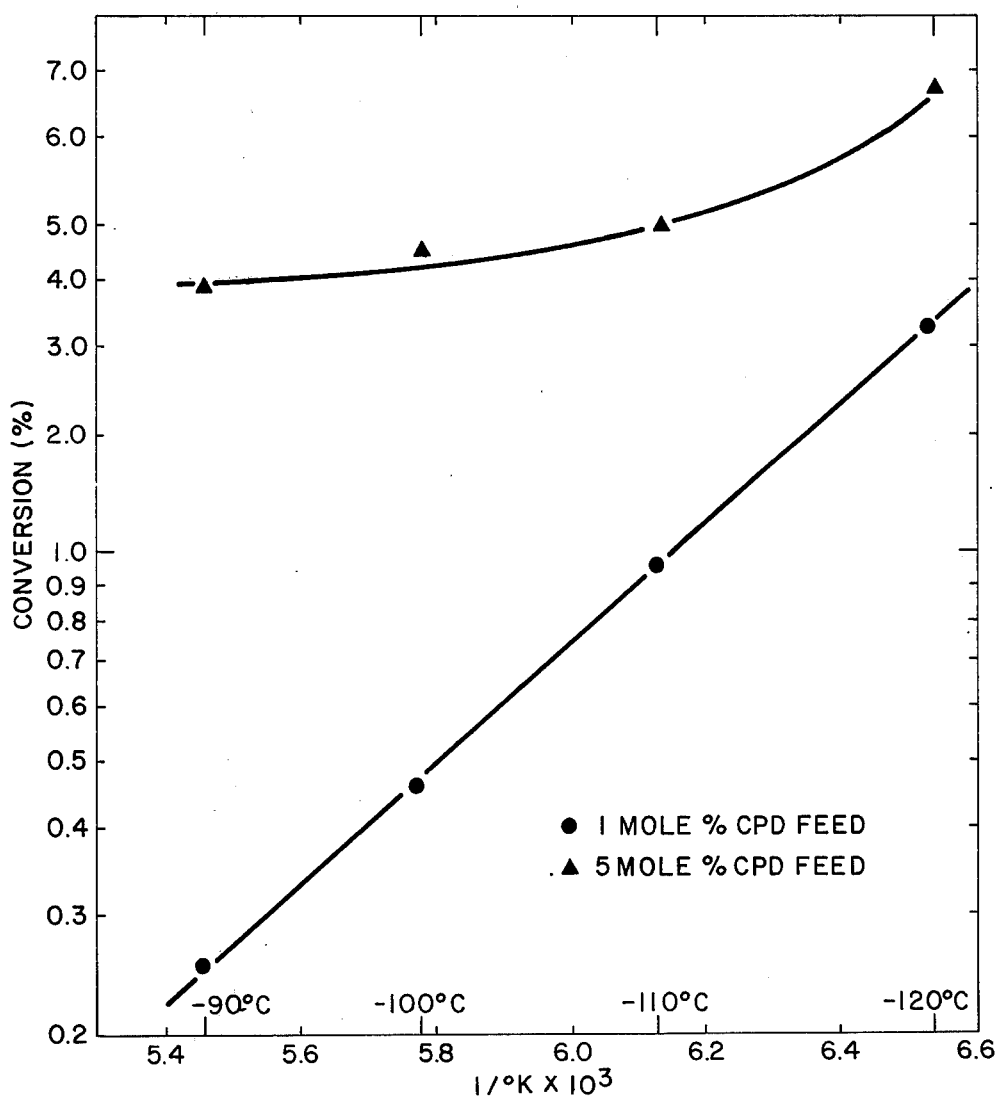

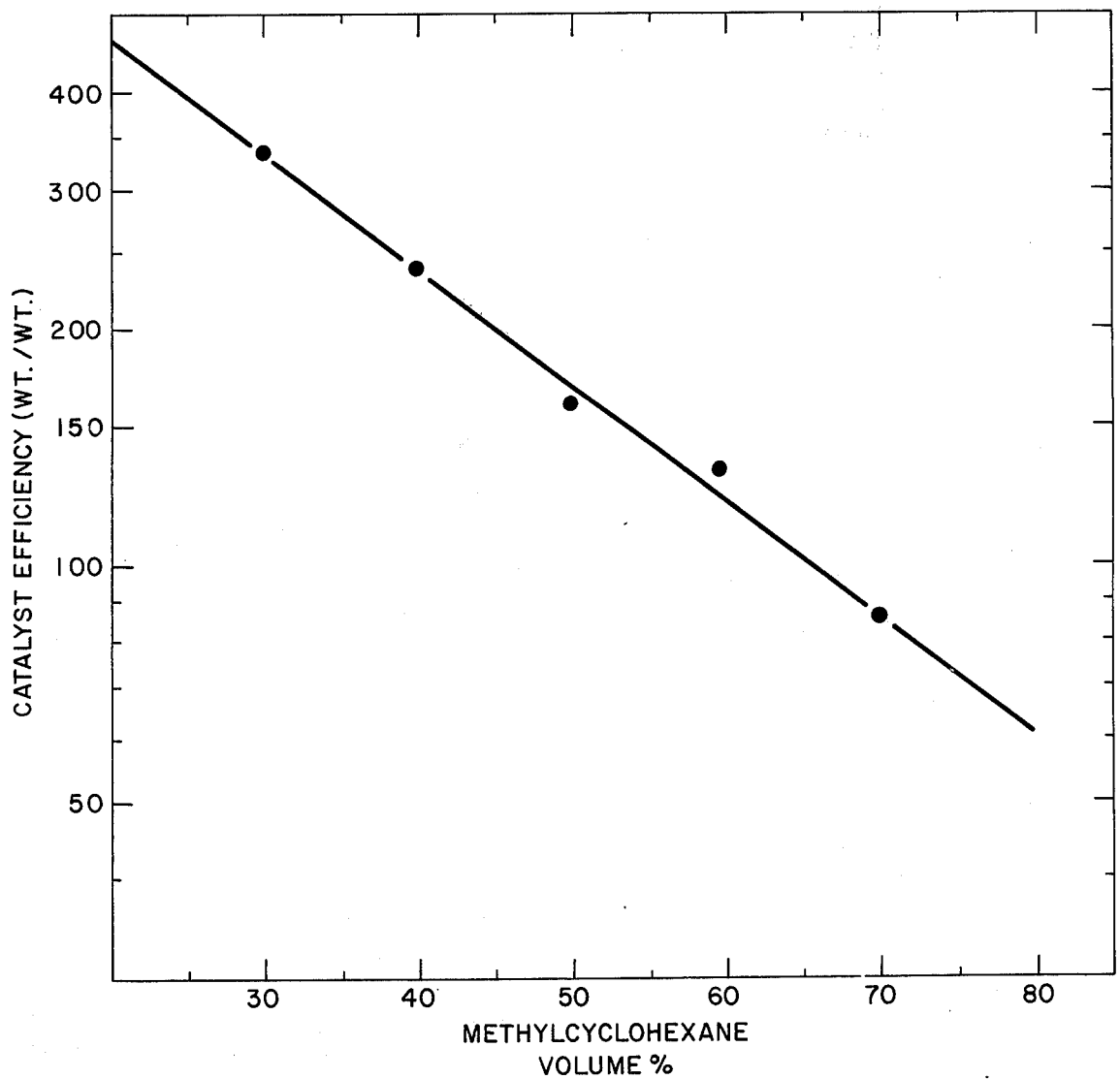

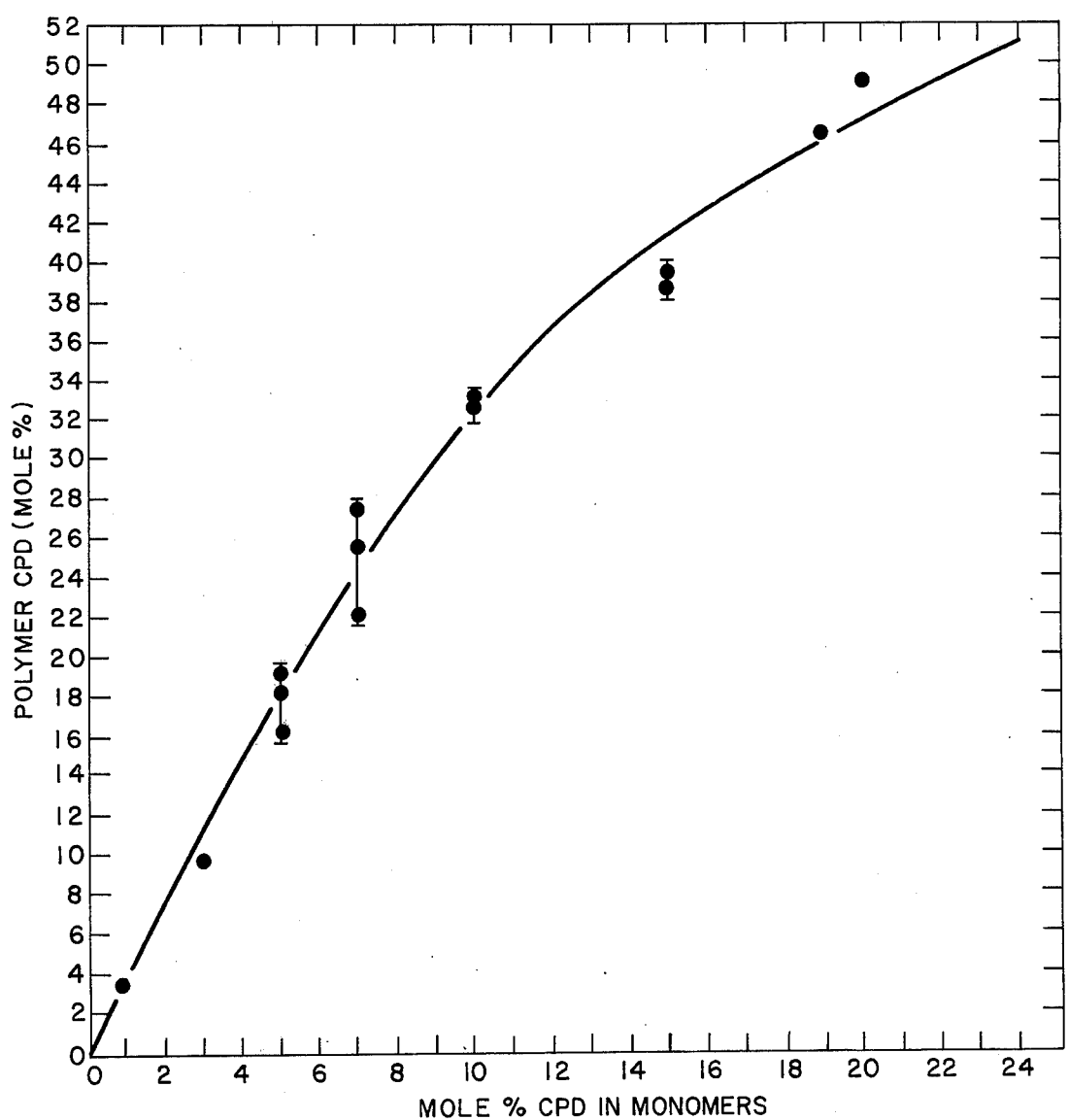
FIGURE VI

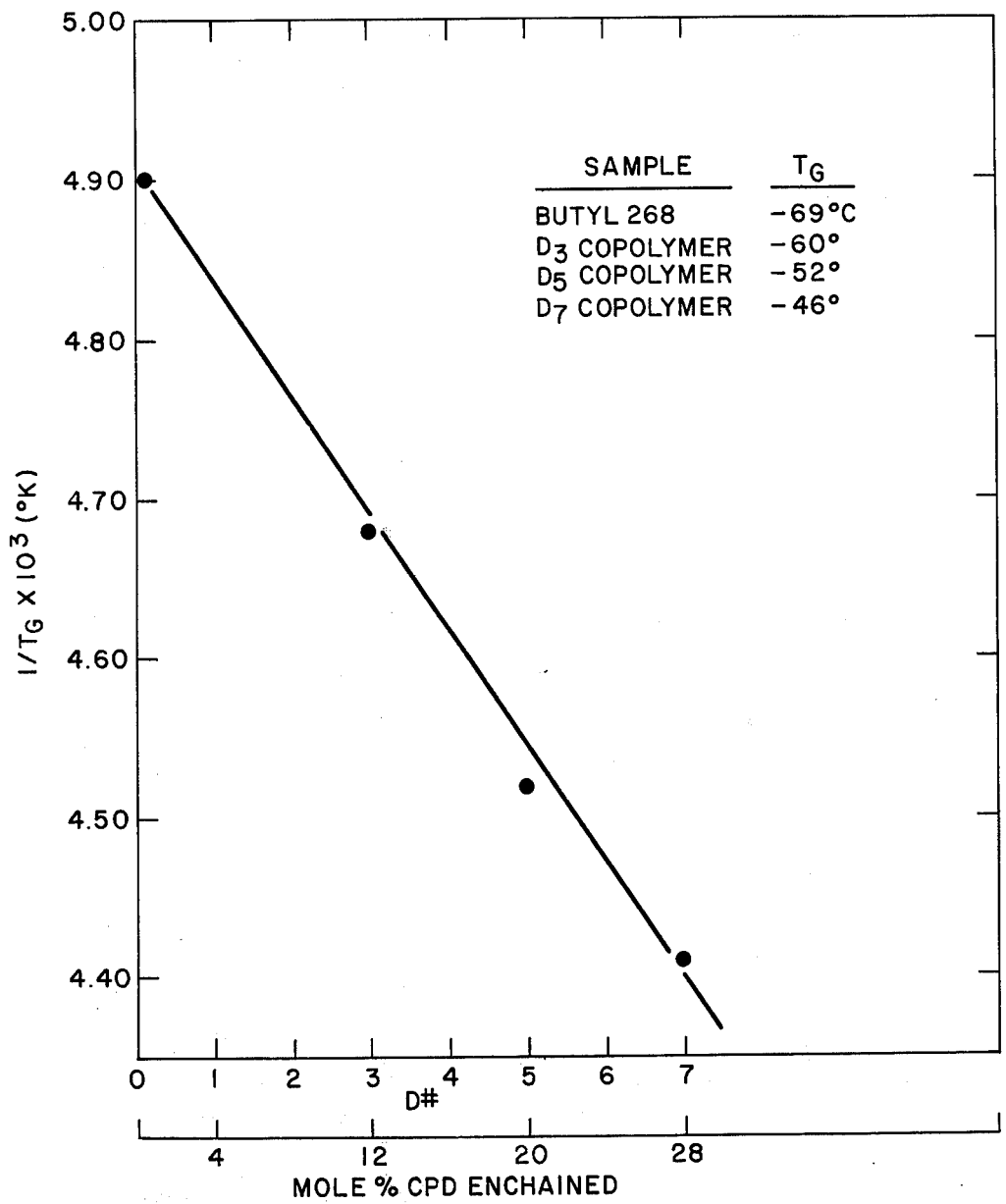

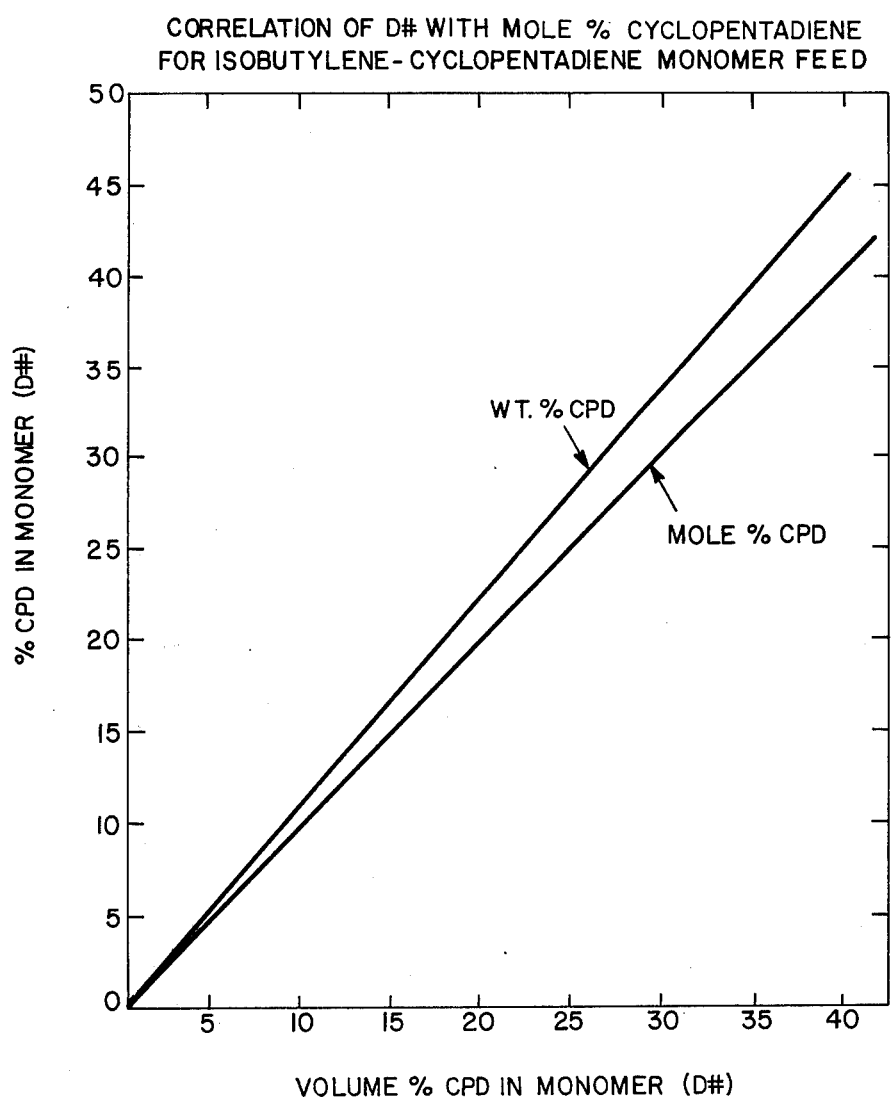

1

HIGH MOLECULAR WEIGHT, HIGH UNSATURATION ISOBUTYLENE-CYCLOPENTADIENE COPOLYMERS

REFERENCE TO RELATED APPLICATIONS

This application is a continuation-in-part application of Ser. No. 457,109, U.S. Pat. No. 3,928,297 filed Apr. 1, 1974 which is a continuation-in-part of Ser. No. 151,038, U.S. Pat. No. 3,808,177 filed June 8, 1971, now U.S. Pat. No. 2,808,177.

BACKGROUND OF INVENTION

Polymers and copolymers of isobutylene are well known in the art. In particular, copolymers of isobutylene with conjugated multiolefins have found wide acceptance in the rubber field. These polymers are generally termed in the art "butyl rubber." The preparation of butyl rubber is described in U.S. Pat. No. 2,356,128, which is incorporated herein by reference.

The term "butyl rubber" as employed in the specification is intended to include copolymers made from the polymerization of a reaction mixture comprising an isoolefin having about 4 to 7 carbon atoms, e.g. isobutylene and a conjugated multiolefin having about 4 to 14 carbon atoms, e.g. isoprene. Although these copolymers are said to contain about 0.2 to about 15% combined multiolefin, in practice the butyl rubber polymers of commerce contain about 0.6 to about 4.5 wt. % of multiolefin; more generally, about 1.0 to about 1.8 wt. %, the remainder of the polymer being comprised of the isoolefin component.

Efforts to prepare isoolefin-multiolefin polymers of high unsaturation have met with varying degrees of success. Where substantially gel-free polymers have been prepared containing more than about 5% multiolefin, the polymers have been of low number average molecular weight. This has been true even where these polymers had high viscosity average molecular weights. In general, however, the products formed by prior art processes are either high in gel content or low in number average molecular weight and of little utility.

Multiolefins are known to be molecular weight and catalyst poisons; furthermore, increased unsaturation in the polymer backbone provides potential sites for gelation. Hence, attempts to prepare more highly unsaturated isoolefin-multi-olefin copolymers by prior art methods have resulted in the formation of either low molecular weight or resinous crosslinked polymers which have little or no commercial utility as elastomers.

Although some commercial elastomers such as styrene butadiene rubber or EPDM may contain as much as 2 to 9% gel, isobutylene copolymers of commerce are substantially gel free. The isobutylene copolymers may contain as much as 2% gel but preferably contain less than 1 %.

There are numerous patents and literature disclosures which generally disclose polymers and copolymers of isobutylene the copolymers purportedly having from about 0.5 to 98% unsaturation. Where the prior art copolymers are high in unsaturation, however, they are either low in number average molecular weight of resinous.

Japanese patent JA27416/68 published 11/26/68 teaches a process for preparing copolymers of conjugated diene compounds with isobutylene which contain "a large amount of conjugated diene compounds" using catalysts prepared by reacting (1) mercuric halide, aluminum halide or hydrogen halide, (2) zirconium halide and (3) aluminum metal in the presence of an aromatic compound, e.g. benzene. These products are described as copolymers which are "rubbery substances when the isobutylene is high and are resinous when the isobutylene content is low". The resinous properties result from gelation and crosslinking of the polymer during its preparation. These gelled and crosslinked products have litle utility as rubbers. The products of lower unsaturation, i.e. high isobutylene content rubbers, are of the conventional butyl rubber type.

Japanese patent No. JA27417/68 published 11/26/68 teaches a method for preparing copolymers of dienes and isoolefins containing about 0.1 to about 40 wt. %, preferably about 0.5 to 5wt. % of diene. The polymers are prepared using a catalyst derived from (1) metal oxides of the general formula $M_xO_y$, wherein M is nickel or cobalt and $1<y/x \leqslant 1.5$, and (2) aluminum halide. Again, the low unsaturation polymers are the conventional butyl rubbers whereas the highly unsaturated materials are either low in number average molecular weight or are gelled polymers.

U.S. Pat. No. 3,165,503 teaches a method for polymerizing butadiene-1,3 hydrocarbons, e.g., isoprene. The invention of this patent is directed primarily towards the preparation of polyisoprene. However, copolymers of isoprene and isobutylene are disclosed. The preferred copolymers are said to contain from about 1 to 50 wt. % of butadiene-1,3 hydrocarbon units. Hydrocarbon copolymers of isoolefin and conjugated dienes prepared by the method taught by the patentee are found to be low in number average molecular weight or gelled polymers.

U.S. Pat. No. 3,466,268 and its parent counterpart, U.S. Pat. No. 3,357,960 disclose a butadiene isobutylene copolymer and a process for preparing said copolymer. The invention disclosed is a method of improving butadiene polymers by incorporating in the structure varying amounts of isobutylene. Preferably, the amount of isobutylene incorporated is said to be about 2 to 40 wt. %. The polymers disclosed are generally low in number average molecular weight. Substitution of isoprene for butadiene results in highly cross-linked copolymers which have little utility.

U.S. Pat. No. 2,772,255 (Br. 744,514) discloses a method for preparing high molecular weight butyl rubbers. In general, the polymers which are prepared are conventional butyl rubbers having less than 3 mole % unsaturation. Attempts to produce butyl rubber type polymers having unsaturation in excess of 5 mole % unsaturation result in products which either are low in number average molecular weight or are gelled and highly crosslinked.

High unsaturation isobutylene-isoprene copolymers have been prepared (see, for example, U.S. Pat. No. 3,242,147 incorporated herein by reference). Although these polymers are purportedly high in viscosity average molecular weight, the average molecular weights are low. Hence, the products have little commercial significance.

Unlike plastics, elastomers require a high number average molecular weight in order to realize desirable levels in physical properties. For example, tensile strength for elastomers is critically dependent on number average molecular weight since these polymers are used well above their glass transition temperature and are generally amorphous.

In contrast to elastomers, plastics are used well below their glass transition temperature and it is molecular associations which gives them their structural integrity. As a result, number average molecular weights in the order of 10,000 to 70,000 are adequate for commercial utility.

Elastomers, on the other hand, obtain their structural integrity from a crosslinked network. Perfection of this network is directly dependent on the length of the polymer molecules from which the network is derived. Number average molecular weight ($\overline{M}n$) is a measure of the length of the molecules. Viscosity or weight average molecular weights are misleading measurements since their numerical value is greatly affected by small variations in the distribution of the higher molecular weight fractions. Hence, polymers of low number average molecular weight may have high viscosity average molecular weight as a result of disproportionate distribution of the high molecular weight fraction.

The importance of number average molecular weight on tensile strength has long been recognized (see, for example, Flory, p. 5, *Ind. Eng. Chem.*, 38, 417 (1946), incorporated herein by reference. Flory showed that for low unsaturation elastomeric copolymers of isobutylene tensile strength increased rapidly as the number average molecular weight was increased beyond a minimum value (i.e. 100,000) then approaches an asymptotic limit.

For economic reasons, oil extendability is an essential characteristic of a commercial elastomer for almost all major uses. The tensile strength of butyl rubber vulcanizates is reduced by the addition of oil, and to retain the original tensile strength of the undiluted composition it is necessary to increase the number average molecular weight. Oil extension also improves the low temperature properties of butyl inner tubes and when this phenomenon was discovered, it was necessary to develop higher molecular weight polymers to accommodate the added oil. See, for example, Buckley et al., *Ind. Eng. Chem.*, 42, 2407 (1950).

This finding resulted in the rapid adoption by industry of the high molecular weight type of butyl GR-1-18 with Mooney viscosity greater than 71 (212° F.). These materials generally have number average molecular weights of 150,000 or greater. In contrast, the previously used polymers which have number average molecular weights of less than 120,000 with Mooney viscosity specification of 38–49 (212° F.) were limited to applications which did not require oil extension, and today represents a very minor portion of the butyl rubber market having been supplanted almost entirely by the higher molecular weight butyl rubbers.

Although it has been postulated that higher unsaturation copolymers of isobutylene would be attractive polymers, useful polymers have not been available since the prior art methods are not capable of producing highly unsaturated, e.g., at least 5 mole % to about 40 mole %, isobutylene copolymers of sufficiently higher number average molecular weight. Hence, the prior art isobutylene-conjugated diene copolymers offered commercially are low in unsaturation, e.g., 1–4.5 mole %.

Hence, heretofore, methods of preparing copolymers of isoolefins and conjugated dienes have not included a means for making commercial quality elastomers containing greater than 5 mole % diene.

Although the isobutylene-conjugated dienes of commerce have improved ozone resistance, these polymers are still subject to ozone cleavage since the site of unsaturation is in the polymer backbone. It has been postulated that isobutylene copolymers having unsaturation on the side chain rather than the backbone would be highly resistant to ozone attack. Attempts to produce such polymers using cyclopentadiene as the diene comonomer have been notably unsuccessful.

Isobutylene-cyclopentadiene copolymers of the prior art have been too low in molecular weight to be of commercial significance. Some improvement in molecular weight has been accomplished by copolymerizing isobutylene with minor amounts of cyclopentadiene (CPD) along with other monomers including crosslinking agents such as divinyl benzene. The resulting products are somewhat improved terpolymers or tetrapolymers resulting from the linking of the low molecular weight isobutylene-CPD chains into two dimensional highly branched polymers. Such polymers, however, have inferior physical properties as compared to the butyl rubbers of commerce and hence have not gained acceptance.

A review of the art illustrates the problems encountered where attempts were made to prepare copolymers of isobutylene and cyclopentadiene (CPD). For example, U.S. Pat. No. 2,577,822, incorporated herein by reference, teaches the need for the addition of divinyl benzene in order to compensate for the deleterious effect of CPD on molecular weight.

U.S. Pat. No. 3,080,337, incorporated herein by reference, teaches the addition of isoprene as a third monomer but the resulting products are low in unsaturation and have poor physical properties. Other have made various attempts to produce CPD isoolefin copolymers with varying degrees of success; see, for example, U.S. Pat. Nos. 3,239,495; 3,242,147; 2,521,359; British Pat. No. 1,036,618 and *I and EC Prod R and D* 1, 216–20 (1962) incorporated herein by reference. These polymers, however, have substantially no commercial significance because, even when only minor amounts of CPD were present, they are low in number average molecular weight.

SUMMARY OF THE INVENTION

It has surprisingly been found that valuable substantially gel-free copolymers of isoolefins and cyclopentadiene having a mole % unsaturation of at least 5% can now be prepared having molecular weight (Mn) of less than 120,000, preferably at least 90,000, by carrying out the polymerization in the presence of not more than about 40 wt. %, based on the total of monomers plus cosolvent, of a cosolvent which is a solvent for the polymer at the polymerization temperature and carrying out the reaction at a temperature of less than about −100° C. The catalyst may be an aluminum halide introduced into the reaction zone dissolved in a polar solvent or the catalyst may be a hydrocarbylaluminum dihalide as disclosed in U.S. Pat. No. 3,856,763, incorporated herein by reference.

The quantity of cosolvent used in kept to a minimum in order to maximize molecular weight. The optimum cosolvent level is determined by selecting ythe minimum solvent-monomer ratio at which the copolymer to be prepared remains in solution at the polymerization temperature.

Surprisingly, the process of this invention makes it possible to prepare isobutylene-cyclopentadiene (CPD) copolymers of high number average molecular weight. Terpolymers of isobutylene, CPD and a third conjugated multiolefin have unexpected ozone resistance.

BRIEF DESCRIPTION OF DRAWINGS

FIG. I shows relationship between critical homogeneous polymerization temperature and diene content.

FIG. II shows the effect of polymerization temperature on number average molecular weight.

FIG. III shows the effect of cosolvent concentration on molecular weight.

FIG. IV shows the effect of polymerization temperature on conversion.

FIG. V shows catalyst efficiency as a function of cosolvent concentration.

FIG. VI shows the relationship between mole % cyclopentadiene in the feed as compared to mole % cyclopentadiene in the polymer.

FIG. VII shows the relationship between glass transition temperature and mole % cyclopentadiene enchainment in the copolymer.

FIG. VIII is a correlation of D # with mole % cyclopentadiene in the monomer feed.

DETAILED DESCRIPTION

This invention relates to a method for preparing substantially gel-free copolymers of isobutylene and cyclopentadiene having a number average molecular weight, as measured by membrane osmometry, of at least 90,000 and a mole % unsaturation of at least 5%.

In order to obtain the copolymers of this invention, the reaction should be carried out at less than about −100° C. To obtain the desired number average molecular weight in a substantially gel-free polymer, a homogeneous polymerization is required. This is achieved by carrying out the reaction in a vehicle which is a solvent for the copolymer at the reaction temperature. The vehicle comprises predominantly the monomers to be polymerizaed in conjunction with an inert cosolvent or mixtures of inert cosolvents plus catalyst solvent. The vehicle (monomers plus cosolvent) must of course be liquid at the polymerization temperature.

It is essential in carrying out the process of this invention that the cosolvent comprise at least 5% by volume and not more than 40% by volume of the total reaction mixture. Preferably, about 5 to about 30 volume % solvent is used; more preferably about 7.5 to 25 weight percent, most preferable about 10 to about 20 weight percent, e.g., 15 volume %. The term "total reaction mixture" as used in the specification and claims means total monomers plus cosolvent.

The optimum amount of cosolvent to be used is the minimum amount necessary to avoid reactor fouling or gelation. If too little cosolvent is used reactor fouling or gelation of the product results. Too high a level results in undesirable lowering of number average molecular weight.

For the purposes of this invention, it is convenient to define the volume % of inert cosolvent as that calculated based on the volume of monomers at the polymerization temperature while the volume of cosolvent is determined at 25° C. The volume % of cosolvent as calculated is uncorrected for volume changes and cooling of the solvent to reaction conditions. The volume of monomers such as cyclopentadiene which freeze at the polymerization temperature were measured at −78° C. (dry ice temperature).

The minimum quantity of a given cosolvent required to produce gel-free polymers is a function of the cosolvent, the conjugated multiolefin used and the polymerization temperature. Having selected the composition of the blend of monomers and the cosolvent to be used the minimum quantity of cosolvent required is readily determined by carrying out the polymerization using varying amounts of cosolvent. The minimum quantity of cosolvent necessary is that amount required to maintain a homogeneous system; that is to prevent precipitation of polymer during polymerization.

The term "cosolvent" as used in the specification and claims means the inert solvent which, together with the monomer feed, comprises the vehicle for the reaction. The cosolvent and monomers must be mutually soluble and the blend of monomers plus cosolvent must be a solvent for the copolymer at the polymerization temperature. The term "inert" means that the cosolvent will not react with the catalyst or otherwise enter into the polymerization reaction. The cosolvent must not contain substituents in its molecule which will interfere with the polymerization reaction. Aliphatic hydrocarbons are suitable cosolvents. The preferred cosolvents are paraffinic hydrocarbons, and carbon disulfide. Preferably, the paraffinic hydrocarbon solvent is a $C_5$–$C_{10}$ hydrocarbon, more preferably a $C_5$ to $C_8$ hydrocarbon. Illustrative examples of the hydrocarbon solvents are pentane, isopentane, methyl pentane, hexane, cyclohexane, methylcyclohexane, dimethylcyclohexane, heptane, isooctane, 1,2,3,3-tetramethyl hexane, tetramethyl cyclohexane, etc. Generally any paraffin, whether normal, branched or cyclic which is a liquid under polymerization conditions, may be used. The term "paraffin" as used in the specification and claims includes normal paraffins, cycloparaffins and branched paraffins or mixtures thereof. When the diene is cyclopentadiene preferred cosolvents contain cycloparaffins.

It will be evident to those skilled in the art that since the monomers act as part of the solvent system for the polymer, the conversion level of the polymerization must not be so great as to result in precipitation of the copolymer as a result of depletion of solvent. Preferably the conversion level is about 2 to about 30%; more preferably about 3 to 15%; most preferably about 5 to about 13%, e.g., 10%.

In the practice of this invention the catalyst can be an aluminum halide or a hydrocarbylaluminum dihalide. Where an aluminum halide is used, it must be in the form of a homogeneous solution or submicron dispersion of catalyst particles, e.g., collodial dispersion. Therefore, the aluminum halide catalyst must be dispersed or dissolved in a suitable catalyst solvent or mixture of solvents. The aluminum halide catalyst solvent must be a polar solvent. Illustrative examples of suitable aluminum halides are $AlCl_3$ and $AlBr_3$. The preferred aluminum halide catalyst is aluminum chloride. The term "polar solvent" as used in the specification and claims means non-aromatic, organic solvents having a dielectric constant at 25° C. of at least 4, preferably about 4 to about 20, more preferably about 6 to about 17; most preferably about 9 to about 13. These polar solvents, however, must not contain sulfur, oxygen, phosphorus or nitrogen in the molecule since compounds containing these elements will react with or otherwise deactivate the catalyst.

The preferred polar solvents are inert halogenated aliphatic hydrocarbons; more preferably halogenated paraffinic hydrocarbons and vinyl or vinylidene halides; most preferably primary or secondary chlorinated paraffinic hydrocarbons. The halogenated hydrocarbon is preferably a $C_1$–$C_5$ paraffin hydrocarbon; more preferably a $C_1$–$C_2$ paraffin. The ratio of carbon atoms to halogen atoms in the polar solvent is preferably 5 or less. Preferably the halogen is chlorine.

Illustrative examples of these polar organic solvents are methylchloride, ethyl chloride, propyl chloride, methyl bromide, ethyl bromide, chloroform, methylene chloride, vinyl chloride, vinylidene chloride, dichloroethylene, etc. Preferably, the polar solvent is methyl chloride or ethyl chloride. Generally any inert halogenated organic compound which is normally liquid under polymerization conditions and has a dielectric constant of at least 4.0 may be used.

It is essential in carrying out this invention that the aluminum halide catalyst be in solution in the polar organic solvent prior to introduction of the catalyst to reaction medium. with the reaction medium and thereafter adding the aluminum halide catalyst thereto will not result in the production of the high $\overline{M}n$, high unsaturation polymers of this invention.

Use of the term "solution" with reference to the polar organic solvent/aluminum halide systems is intended to include both true solutions and colloidal dispersions since they may exist concurrently in the same system.

The aluminum halide/polar solvent catalyst preferably comprises about 0.01 to about 2 weight % aluminum halide; more preferably about 0.05 to about 1; most preferably 0.1 to about 0.8.

As previously noted, the catalyst may also be a hydrocarbylaluminum dihalide. The hydrocarbyl group can be a $C_1$–$C_{18}$ straight chain, branched or cyclic group. Both cycloaliphatic and aromatic substituents can comprise the hydrocarbyl radical. Alkyl groups, especially lower alkyl groups, e.g., $C_1$–$C_4$, are preferred because of their general availability and economy of use. The halide can be bromine or chlorine, preferably chlorine. The term "dihalide" as used in the specification and claims means dichloride or dibromide.

Illustrative examples of these hydrocarbyl aluminum dihalides are methylaluminum dichloride, ethylaluminum dichloride, isobutylaluminum dichloride, methylaluminum dibromide, ethylaluminum dibromide, benzylaluminum dichloride, phenylaluminum dichloride, xylylaluminum dichloride, toluylaluminum dichloride, butylaluminum dichloride, hexylaluminum dichloride, octylaluminum dichloride, cyclohexylaluminum dichloride, etc. The preferred catalyst are methylaluminum dichloride, ethylaluminum dichloride and isobutylaluminum dichloride.

The hydrocarbyl aluminum dihalide catalyst may be added neat or in solution. Preferably where a catalyst solvent is used, it is a liquid paraffin solvent or cycloparaffin solvent. It is advantageous though not necessary to use paraffins of low freezing point. Methylcyclohexane is particularly useful since catalyst solutions of about 1% concentration do not freeze at −120° C.

The concentration of the catalyst is not critical. Very dilute catalyst solutions, however, are not desirable since substantial fractions of the catalyst may be deactivated by impurities. Very concentrated solutions are undesirable since at polymerization temperatures catalyst may be lost by freezing out of solution.

In carrying out the polymerization of this invention those skilled in the art will be aware that only catalytic amounts of catalyst solution are required. Preferably the volume ratio of monomer plus cosolvent to catalyst solution is about 100/1 to about 9/1; more preferably about 80/1 to about 10/1; most preferably about 50/1 to about 20/1.

In practicing the process of this invention, it is essential that the polymerization be carried out in the homogeneous phase without the precipitation of polymer. Conventional slurry processes are inapplicable for the preparation of the high unsaturation polymers of this invention since by their nature they result in polymer precipitation with gelation of the polymer as a consequence.

The amount of cosolvent required in order to maintain the polymerization reactants and product in solution throughout the polymerization is a function of the multi-olefin selected for polymerization and its concentration in the monomer feed. The polymerization temperature at which precipitation of polymer will occur is itself a function of the amount of and type of cosolvent and the particular multi-olefin being copolymerized.

The term "critical homogeneous polymerization temperature" as used in the specification and claims means that polymerization temperature below which precipitation of polymer will occur when no cosolvent is included in the reaction mixture, i.e., the only solvent for the reactants and product being the monomer feed.

Characterization of polymers prepared by bulk polymerization, i.e., without cosolvent, shows that the polymers formed are low in number average molecular weight ($\overline{M}n$). In order to increase $\overline{M}n$, the lowering of polymerization temperature is an obvious expedient. However, in the absence of cosolvent, the result is not greater $\overline{M}n$ but gelation.

The problem of gelation is obviated by the addition of a cosolvent which permits the lowering of polymerization temperature below the critical homogeneous polymerization temperature. It has been found that a polymerization temperature below about −100° C. is necessary in order to achieve $\overline{M}n$ values of at least 90,000 for cyclopentadiene copolymer. At least 5 volume % inert solvent based on the monomer feed is necessary in order to carry out the polymerization in solution at these low temperatures.

The necessity for utilizing low polymerization temperatures is exemplified by FIG. 2 which shows the exponential decrease in number average molecular weight with increasing temperature. The criticality of selecting the proper quantity of cosolvent is demonstrated in FIG. 3. Too little cosolvent results in precipitation of the polymer with reactor fouling or gelation. Too much cosolvent results in a low molecular weight product. Further benefits of low temperature and proper selective of appropriately low cosolvent concentration are demonstrated in FIGS. 4 and 5. FIG. 4 shows that reactivity is favored by low temperatures (in addition to the molecular weight benefit). FIG. 5 shows that catalyst efficiency is favored by low cosolvent concentration (in addition to the molecular weight benefit).

In practicing the process of this invention, one skilled in the art may proceed as follows in order to determine the preferred reaction conditions.

First, a convenient polymerization temperature below about −100° C. is selected. Next the desired feed composition, i.e. monomers and ratio of isoolefin to conjugated diene and the cosolvent to be used are selected. Polymerization reactions are carried out using successively greater amounts of solvent. The initial polymerization reaction is carried out using 5 volume % based on the total of monomer plus solvent of the cosolvent since lesser amounts will be inadequate. In each successive run an additional 5 volume % is added. The procedure is continued until the reaction medium remains clear throughout the reaction. Turbidity is indicative of precipitation of polymer which leads to reactor fouling or gelation.

The polymer formed is characterized for $\overline{Mn}$ and mole % unsaturation. Where a higher $\overline{Mn}$ is desired it may be achieved by either lowering the polymerization temperature or where possible using alightly less solvent than determined by the above method, e.g., 1–2 vol. % less, provided that turbidity does not occur. Reduction of polymerization temperature may result in a greater cosolvent requirement. Hence, the aforegoing procedure of adding additional solvent to the reaction medium must be continued until the reaction medium is again clear throughout the polymerization.

Where the mole % unsaturation is to be adjusted somewhat more or less of the diene is used depending on whether a slightly higher or lower unsaturation is desired. Change in feed composition may require readjusting the cosolvent requirement. Generally, increasing the multiolefin content of the monomer feed decreases the cosolvent requirements of the system with acyclic diene-like isoprene and increases the cosolvent requirement with cyclicdiene such as cyclopentadiene.

The optimum reaction conditions are those which give the maximum $\overline{Mn}$ at the highest (warmest) temperature for the desired unsaturation level. The smaller the quantity of cosolvent used the greater the $\overline{Mn}$. Economic considerations dictate the use of the warmest temperature practical for polymerization. Use of lower temperatures will necessitate the use of greater amounts of cosolvent.

In an alternate approach to determine the necessary quantity of cosolvent, the reactions are carried out in bulk without using cosolvent. For each different multiolefin content monomer feed, polymerizations are carried out at progressively lower temperatures until the critical homogeneous polymerization temperatue for the feed composition is determined. The polymerization is repeated for different feed compositions and the data oobtained are the critical homogeneous polymerization temperatures as a function of multiolefin content of the feed. A plot of these data gives the critical homogeneous polymerization temperature curve analogous to that of FIG. 1. The polymer formed is analyzed for multiolefin content and a determination is made of the correlation mole % unsaturation in the polymer and volume % multiolefin in the feed. The polymer formed in bulk copolymerization of isobutylene and cyclopentadiene is unsuitable for commercial use since it has a very low $\overline{Mn}$. In order to increase the $\overline{Mn}$ of the polymer it is necessary to carry out the polymerization at lower temperatures, e.g., less than about −100° C., which requires the addition of cosolvent to prevent precipitation of polymer during polymerization.

The quantity of solvent used should be kept to a minimum since excess cosolvent results in the lowering of $\overline{Mn}$. In determining the amount of solvent to be used the monomer feed composition is determined. A convenient polymerization temperatures below about −100° C. is selected.

The minimum cosolvent requirements for a particular isoolefin-multiolefin may be determined by carrying out the polymerization at the critical homogeneous polymerization temperature for the isoolefin-multiolefin feed composition, terminating the polymerization by destroying the catalyst and, with constant stirring, lowering the temperature of the system to the desired polymerization temperature. The polymer which, of course, is by definition insoluble below the critical homogeneous polymerization temperature will precipitate out and the system will appear turbid. The polymer will not be gelled, however, since polymerization was terminated prior to precipitation. The cosolvent selected is then added in incremental amounts until the turbidity disappears. The quantity of solvent so added is a good approximation of the minimum solvent requirements for a given isoolefin-multiolefin feed to be polymerized at a given temperature.

The term "solution polymerization" as used in the specification and claims means a polymerization carried out so that the polymer product remains dissolved throughout the reaction.

Where the diene is cyclopentadiene the preferred cosolvents are cycloparaffins or paraffinic mixtures containing cycloparaffins, preferably $C_6$ and $C_7$ cycloparaffins (i.e. cyclohexane, methylcyclohexane), utilized at about 15 to about 30 volume % e.g., 20 to about 25 volume %.

Utilizing the process of this invention, it is now possible to prepare such cyclodiene copolymers having as little as 0.5 mole % unsaturation and as high as 40 mole % unsaturation. Preferably, these cyclodiene polymers contain about 3% to about 40%; more preferably about 6.5 to about 40 mole % unsaturation; most preferably 8 to about 40 mole %, e.g., 12 to about 40 mole %. As a result of the relatively lower reactivity of the unsaturation as compared to the isoprene-diene copolymers, copolymers having incorporated therein about 2–4 mole % cyclic diene are about as reactive as butyl rubber having an acyclic diene content of about 0.5 to about 1.5 mole % and require ulta acceleration for sulfur vulcanization. By contrast the higher unsaturation copolymers, e.g., at least 5 mole %, preferably at least 8 mole %, may be sulfur vulcanized using the delayed action accelerator cure systems described above.

In general, the copolymers of this invention must not contain more than 40 mole % unsaturation. When the multiolefin is a cyclic multiolefin above 40 mole % unsaturation, the glass transition temperature of the polymer is too high. As a result, the polymers have poor low temperature characteristics. The copolymers of this invention have about 5 to about 40 mole % unsaturation; preferably about 8 to about 40 mole %; more preferably about 8 to about 35 mole %; most preferably about 12 to about 35 mole %. Surprisingly copolymers high in cyclopentadiene content are useful elastomeric products at lower molecular weights than butyl rubbers.

As has been pointed out earlier the highly unsaturated polymers of this invention are substantially as impermeable to air as are commercial low unsaturates, e.g., 1.5 mole % butyl rubbers. Surprisingly, isoolefin copolymers of CPD or terpolymers of an isoolefin-CPD and an acyclic diene are less permeable to air at the higher unsaturation levels than is the low unsaturation butyl rubber of commerce.

Thus, the process of this invention permits the preparation of isoolefin copolymers, heretofore unattainable, which surprisingly retain all of the advantageous characteristics of conventional low unsaturation butyl rubber while exhibiting improved vulcanization characteristics and in some cases, e.g., CPD copolymers, improved ozone resistance and air impermeability.

The term "substantially gel free" as used in the specification and claims means copolymers containing less than 2 wt. % gel; more preferably less than 1% gel, e.g., ½% gel. The term "D # " where # is an integer means the volume % cyclopentadiene in a monomer mixture wherein D represents cyclopentadiene and the integer is the volume % diene.

The advantages of this invention may be more readily appreciated by reference to the following examples.

EXAMPLE 1

Attempt to copolymerize 95 mole % and 5 mole % cyclopentadiene (D5) with triethylaluminum and a cocatalyst at −120° C.

One liter of a solution of isobutylene, cyclopentadiene, and methylcyclohexane in the proportions of 75, 4.7 and 20.3 wt. % respectively was stirred at −120° C. and 20 ml of a solution of 0.72% triethylaluminum in methylcyclohexane was added. No polymerization occured.

3-Bromocyclopentene 0.4945g (3.36 × $10^{-3}$ moles) was added in a further attempt to initiate the copolymerization. Again no reaction occurred.

EXAMPLE 2

The method of Example 1 was repeated as −90° C. No polymerization occurred. The temperature was warmed to −50° C. and still no reaction occurred. Diethylaluminum chloride (0.2 g) was added without any effect. Additional bromocyclopentene was added (1.3 g) and still no reaction occurred.

Ethylaluminum dichloride (0.16 g) was then added and rapid copolymerization ensued.

EXAMPLE 3

Copolymerization of isobutylene with 5 mole % cyclopentadiene (D5) at −120° C. using ethylaluminum dichloride.

Reaction of Example 1 repeated using ethylaluminum dichloride (1% in methylcyclohexane as catalyst). One half liter of a solution of 75, 4.7, and 20.3 wt. % isobutylene, cyclopentadiene and methylcyclohexane respectively were stirred at −120° C. and 5 ml of the EtAlCl$_2$ catalyst solution added. The polymerization temperature was maintained at −115° to −120° C. for ten minutes and the reaction was terminated with a few drops of alcohol. The copolymer was coagulated from hot methanol containing a small quantity of base and antioxidant (N-phenyl- $\beta$ -naphthylamine). The yield was 15.2 g of copolymer with a number average molecular weight of 176,000 and an inherent viscosity of 1.677 (toluene at 25° C.).

EXAMPLE 4

Copolymerization of isobutylene with 7 mole % cyclopentadiene (D7) was carried out in the method of Example 3 using 7 ml of ethylaluminum dichloride catalyst solution. The reaction temperatue was −114° too −120° C. for 10 minutes. A yield of 15.0 g of copolymer was obtained with a number average molecular weight of 188,000 and an inherent viscosity of 1.4129 (toluene at 25° C.).

EXAMPLE 5

Copolymerization of isobutylene with 3 mole % cyclopentadiene (D3) using 3 ml of ethylaluminum dichloride catalyst solution yield 7.65 of copolymer with a number average molecular weight of 221,000 and an inherent viscosity of 2.497 (toluene at 25° C.).

EXAMPLE 6

Copolymerization of isobutylene and isoprene (B15) using methylaluminum dichloride catalysis.

A mixture of 476 ml isobutylene and 84 ml isoprene (at −120°) together with 140 ml n-heptane (at 25°) was stirred at −120° C. and 30 ml of a catalyst solution of 0.82 g MeAlCl$_2$ in 100 ml n-heptane was added over 5 min. The reaction temperature was −115° C. and the polymerization was terminated after 17 minutes. The yield was 27.8 g of copolymer with a number average molecular weight of 171,000.

EXAMPLE 7

Copolymerization of isobutylene and isoprene (B15) using ethylaluminum dichloride.

The experiment of Example 6 was repeated using 40 ml of a catalyst solution of 0.756 EtAlCl$_2$ in 100 ml of n-heptane. The yield was 16.7 g of copolymer of 185,000 number average molecular weight.

EXAMPLE 8

Similar experiments using a B30 feed yielded copolymer of 168,000 and 149,000 number average molecular weight using methyl and ethylaluminum dichloride respectively.

EXAMPLE 9

Copolymer compositions were determined by infrared analysis in case of isobutylene-isoprene copolymers. Isobutylene-cyclopentadiene copolymers as well as termpolyers of isobutylene, cyclopentadiene and isoprene were analyzed by nuclear magnetic resonance spectroscopy.

In general, the cyclopentadiene contents of copolymers was three to four times that of the monomer in the feed up to about 7 mole % CPD based on total monomer in feed (FIG. 6). This correspondence was confirmed by the linear change of glass transition temperature with mole % CPD in the feed up to D7 (FIG. 7). A correlation between volume % CPD in monomers and weight or mole % is presented in FIG. 8.

EXAMPLE 10

Terpolymer of isobutylene, isoprene and cyclopentadiene (B10, D5).

A solution of 952 ml isobtutylene and 112 ml isoprene (at −120° C.) together with 56 ml cyclopentadiene (at −78° C.) and 280 ml n-heptane (at 25° C.) was stirred at −120° C. and 50 ml of a catalyst solution of 1% ethylaluminum dichloride in n-heptane was added. The reaction temperature was −118° to −120° C. and the reaction was terminated after 20 min.

A yield of 36.8 g of terpolymer was isolated with a number average molecular weight of 148,000. Analysis by TAC 100 MHz rmr revealed a composition of 74% isobutylene, 18% cyclopentadiene and 8% isoprene (mole), indicating terpolymer enchained diene in quantities close to that of copolymer.

EXAMPLE 11

The copolymerization of isobutylene with 5 mole % cyclopentadiene (D5) in the presence of 20% methylcyclohexane cosolvent was carried out at −120° C. using equimolar quantities of different hydrocarbylaluminum dihalide catalysts. The results tabulated below emphasize that R may be varied but catalysts with lower hydrocarbyl groups have higher efficiency and are preferred.

COMPARISON OF ALKYLALUMINUM DIHALIDES IN HYDROCARBON SOLUTION
D-5 COPOLYMERIZATION WITH 20% METHYLCYCLOHEXANE COSOLVENT (−120° C.)*

| Species | Catalyst Mole | Grams | Monomer Conversion % | $\bar{M}n \times 10^{-3}$ | $\eta$ 25° toluene | Catalyst Efficiency wt/wt | g/mole | mole |
|---|---|---|---|---|---|---|---|---|
| Isobutyl AlCl$_2$ | 6.3×10$^{-4}$ | 0.098 | 4.5 | 191,000 | 1.5799 | 139 | 21,500 | 0.113 |
| Ethyl AlCl$_2$ | 6.3×10$^{-4}$ | 0.080 | 6.0 | 212,000 | 1.5168 | 225 | 28,500 | 0.134 |
| Methyl AlCl$_2$ | 6.3×10$^{-4}$ | 0.071 | 6.9 | 238,000 | 1.5969 | 296 | 33,200 | 0.139 |
| Ethyl AlBr$_2$ | 6.3×10$^{-4}$ | 0.137 | 3.1 | 226,000 | 1.4214 | 69 | 14,920 | 0.066 |
| Ethyl AlI$_2$ | 6.3×10$^{-4}$ | 0.203 | 0.4 | — | 0.4028 | 6 | 1,905 | — |

*Isobutylene, 380 ml; cyclopentadiene, 20 ml; methylcyclohexane, 100 ml; catalyst solution, 10 ml containing indicated quantity of RAlX$_2$.

EXAMPLE 12

The effect of dilution upon catalyst solution was determined using a constant quantity of ethylaluminum dichloride catalyst.

A D5 copolymerization feed consisting of 380 ml isobutylene (at −120° C.), 20 ml cyclopentadiene (at −78° C.) and 100 ml methylcyclohexane (at 25° C.) was stirred at −120° and solution containing a total of 0.08 g of ethylaluminum dichloride in methylcyclohexane at various dilution levels added. The reactions were permitted to proceed for 20 minutes and were terminated with a few drops of alcohol. The results are tabulated below. Catalyst solution concentrations are expressed in grams per 100 ml.

INFLUENCE OF CATALYST SOLUTION CONCENTRATION
(D5 COPOLYMERIZATION, −120° C., 0.08 EtAlCl$_2$)

| Catalyst Concentration (%) | Monomer Conversion | Catalyst Efficiency | Mn |
|---|---|---|---|
| 40 | 3.8% | 144 | 157,000 |
| 20 | 4.3 | 166 | 157,000 |
| 10 | 4.2 | 160 | 208,000 |
| 5 | 5.7 | 215 | 191,000 |
| 2.5 | 3.4 | 129 | 189,000 |
| 1.25 | 4.6 | 175 | 177,000 |

The results show that the concentration of the catalyst solution is not a significant factor.

What is claimed is:

1. A substantially gel-free copolymer consisting of a major portion of isobutylene and about 5 to about 40 mol % cyclopentadiene, said copolymers having a number average molecular weight of about 90,000 to 120,000.

2. The copolymer of claim 1 wherein the mole % of cyclopentadiene is about 8 to about 35%.

* * * * *